(12) United States Patent
Liu et al.

(10) Patent No.: US 9,584,566 B2
(45) Date of Patent: Feb. 28, 2017

(54) METHOD AND SYSTEM FOR SYNCHRONIZING DUPLICATED CONTENTS IN MULTIPLE TERMINALS

(71) Applicant: Tencent Technology (Shenzhen) Company Limited, Shenzhen (CN)

(72) Inventors: Yulei Liu, Shenzhen (CN); Bo Hu, Shenzhen (CN); Ruiyi Zhou, Shenzhen (CN); Xi Wang, Shenzhen (CN); Kai Zhang, Shenzhen (CN); Zhengkai Xie, Shenzhen (CN); Xin Qing, Shenzhen (CN); Bosen He, Shenzhen (CN); Huijiao Yang, Shenzhen (CN); Ying Huang, Shenzhen (CN); Wei Li, Shenzhen (CN); Cheng Feng, Shenzhen (CN); Tingyong Tang, Shenzhen (CN); Sha Mo, Shenzhen (CN); Zhipei Wang, Shenzhen (CN); Renfang Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 387 days.

(21) Appl. No.: 14/148,595

(22) Filed: Jan. 6, 2014

(65) Prior Publication Data
US 2014/0379821 A1 Dec. 25, 2014

Related U.S. Application Data

(63) Continuation of application No. PCT/CN2013/087452, filed on Nov. 19, 2013.

(30) Foreign Application Priority Data

Jun. 20, 2013 (CN) .......................... 2013 1 0246707

(51) Int. Cl.
H04L 29/06 (2006.01)
H04L 29/08 (2006.01)
H04L 12/58 (2006.01)

(52) U.S. Cl.
CPC .............. *H04L 65/403* (2013.01); *H04L 51/04* (2013.01); *H04L 67/1095* (2013.01); *H04L 51/18* (2013.01)

(58) Field of Classification Search
CPC ........ H04L 65/403; H04L 51/04; H04L 51/18; H04L 67/1095
See application file for complete search history.

(56) References Cited

U.S. PATENT DOCUMENTS

2005/0243810 A1* 11/2005 Nose ................. H04L 29/06027
370/356
2007/0124406 A1* 5/2007 Liu ....................... H04L 67/025
709/209

(Continued)

FOREIGN PATENT DOCUMENTS

CN 101390078 A 3/2009

OTHER PUBLICATIONS

Raphael, "Chrome for Android's hidden feature: PC-to-mobile page beaming", Feb. 7, 2012, Computerworld, 2 pages.*

(Continued)

*Primary Examiner* — Arvin Eskandarnia
*Assistant Examiner* — Amy Ling
(74) *Attorney, Agent, or Firm* — Morgan, Lewis & Bockius LLP (57) ABSTRACT

The present application discloses methods and systems for synchronizing duplicated contents between multiple terminals. By establishing a mapping relationship between multiple accounts for different application programs installed on different terminals, a server may transmit captured contents (Continued)

between the accounts so that the contents are displayed and/or further distributed. After receiving a content forwarding request from a second account associated with a browser application in a second terminal, the server may process the content forwarding request, which includes the captured contents and identifiers. Using the identifiers and the mapping relationship, the server may identify a first terminal with an instant messaging application having a first account. The captured contents may be transferred to the first account so that the captured contents may be displayed and/or further distributed. The present application provides additional convenience and efficiency for multi-terminal operations.

20 Claims, 7 Drawing Sheets

(56) References Cited

U.S. PATENT DOCUMENTS

| | | | | |
|---|---|---|---|---|
| 2011/0145064 A1* | 6/2011 | Anderson | ............. | G06Q 30/02 |
| | | | | 705/14.53 |
| 2011/0202971 A1* | 8/2011 | Margolin | ................ | H04L 67/10 |
| | | | | 726/3 |
| 2011/0222676 A1* | 9/2011 | Okada | .................... | H04N 7/147 |
| | | | | 379/93.21 |
| 2012/0047276 A1* | 2/2012 | Lindquist | ............ | H04L 65/1016 |
| | | | | 709/228 |
| 2013/0238728 A1* | 9/2013 | Fleck | ...................... | H04L 51/36 |
| | | | | 709/206 |
| 2014/0123025 A1* | 5/2014 | Bau | ......................... | H04L 51/04 |
| | | | | 715/752 |
| 2015/0032813 A1* | 1/2015 | Doshi | ................... | H04L 65/403 |
| | | | | 709/204 |
| 2015/0172239 A1* | 6/2015 | Lynch | .................... | H04L 67/26 |
| | | | | 709/206 |

OTHER PUBLICATIONS

Tencent Technology, ISRWO, PCT/CN2013/087452, Mar. 27, 2014, 7 pgs.

Tencent Technology, IPRP, PCT/CN2013/087452, Dec. 22, 2015, 5 pgs.

* cited by examiner

METHOD AND SYSTEM FOR SYNCHRONIZING DUPLICATED CONTENTS IN MULTIPLE TERMINALS

RELATED APPLICATIONS

This application is a continuation application of PCT Patent Application No. PCT/CN2013/087452, entitled "METHOD AND SYSTEM FOR SYNCHRONIZING DUPLICATED CONTENTS IN MULTIPLE TERMINALS" filed Nov. 19, 2013, which claims priority to Chinese Patent Application No. 201310246707.6, "METHOD AND SYSTEM FOR SYNCHRONIZING DUPLICATED CONTENTS IN MULTIPLE TERMINALS," filed Jun. 20, 2013, both of which are hereby incorporated by reference in their entirety.

FIELD OF THE INVENTION

The present application relates to the field of information processing, and in particular to methods and systems for synchronizing duplicated contents in multiple terminals.

BACKGROUND OF THE INVENTION

With the rapid development and extending popularity of smart terminal devices, such as smart phones and tablet computers, people are no longer limited to using only one terminal device for network operations. Nowadays, users increasingly tend to use different terminal devices for different purposes and even use a combination of multiple devices for one or more network operations.

Although the use of multiple terminals for network operations bring people great convenience, sometimes it becomes cumbersome when the user is trying to use the same content in multiple devices. Oftentimes, the user needs to enter the same contents in each terminal device one at a time, leading to burdensome and complicated input operations, increasing input frequency of the same contents and reducing input efficiency. For example, a user reads an article with a tablet computer and finds one topic particularly interesting; however, at this moment the user has to get going with only a mobile phone, leaving his/her table computer behind; if the user wants to learn more about the topic, now he/she may need to search the article in the mobile phone by inputting the topic of the article, wherein it is inconvenient and error-prone to enter topic content in the mobile phone, making the entire operation repetitive and less efficient.

Accordingly, it is necessary and desirable to provide a new technology, so as to resolve the technical problem and improve the above-mentioned approach.

SUMMARY

The above deficiencies and other problems associated with managing duplicated contents are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a computer system. The computer system, such as a server, may establish a mapping relationship between a first account of a first program such as an instant messaging application installed on the first terminal and a second account of a second program such as a browser application installed on the second terminal. After receiving a content forwarding request from the second terminal through the second account of the browser application, the computer system may process the request and provide a response, wherein the content forwarding request includes content captured by a user of the second terminal using the browser application and an identifier of the second account of the browser application. In response to the content forwarding request: the computer system may identify an identifier of the first account of the instant messaging application installed on the first terminal according to the mapping relationship; and send a message to the first terminal, the message including the captured content to be displayed in a predefined field of the instant messaging application installed on the first terminal.

Another aspect of the invention involves a computer system. The computer system may comprise one or more processors, memory, and one or more program modules stored in the memory and configured for execution by the one or more processors, the one or more program modules including: a mapping module configured to establish a mapping relationship between a first account of an instant messaging application installed on the first terminal and a second account of a browser application installed on the second terminal; a receiving module configured to receive a content forwarding request from the second terminal through the second account of the browser application, wherein the content forwarding request includes content captured by a user of the second terminal using the browser application and an identifier of the second account of the browser application; and a response module configured to: in response to the content forwarding request, identify an identifier of the first account of the instant messaging application installed on the first terminal according to the mapping relationship; and send a message to the first terminal, the message including the captured content to be displayed in a predefined field of the instant messaging application installed on the first terminal.

Another aspect of the invention involves a non-transitory computer readable storage medium having stored therein instructions, which, when executed by a computer system, cause the computer system to: establish a mapping relationship between a first account of an instant messaging application installed on the first terminal and a second account of a browser application installed on the second terminal; receive a content forwarding request from the second terminal through the second account of the browser application, wherein the content forwarding request includes content captured by a user of the second terminal using the browser application and an identifier of the second account of the browser application; and in response to the content forwarding request: identify an identifier of the first account of the instant messaging application installed on the first terminal according to the mapping relationship; and send a message to the first terminal, the message including the captured content to be displayed in a predefined field of the instant messaging application installed on the first terminal.

Some embodiments may be implemented on one or more computer devices in a network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
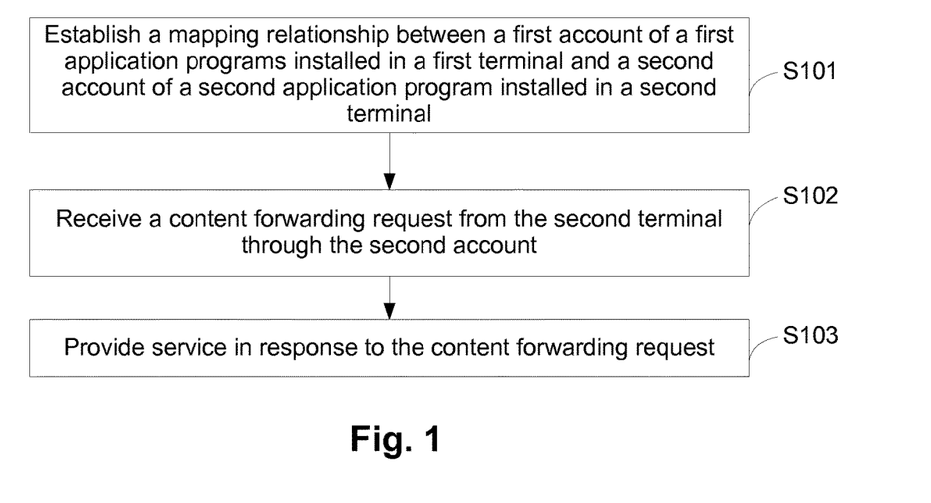
FIG. 1 is a flowchart illustrative of an information processing method in accordance with some embodiments of the present application.

FIG. 1 is a flowchart illustrative of an information processing method in accordance with some embodiments of the present application. As shown by step S101 of FIG. 1, a computer system such as a server, may establish a mapping relationship between a first account in a first terminal and a second account in a second terminal. The first account may be associated with a first application program installed on the first terminal, and the second account may be associated with a second application program installed on the second terminal, wherein the first program and the second program are the same or different programs.

The computer system may be any computing device that has networking and data processing capabilities, such as but not limited to servers, workstations, personal computer such as desktops and laptops, and mobile devices. Here a server may be used as an example for the computer system. The server may be any kind of server that may be used to provide synchronization, such as but not limited to a browsing server, an instant messaging (IM) server, a WeChat® server, a reading server, and a multi-media server. The terminals may serve as examples for any kind of computing devices such as but not limited to personal computers (PC), smart phones (e.g. Android® or IONS® phones), tablet computers, and personal digital assistants (PDAs). The terminals, e.g. the first terminal and the second terminal, are connected to the server via network connections, such as the internet.

In some embodiments, the first account and the second account are registered through the first program and the second program, respectively. In some embodiments, the first account and the second account are registered by the same user. The server may map accounts by establishing corresponding relationships between the accounts, so that identifiers submitted from one account may be used to extract the identifiers of the other accounts and access the other accounts. The server may set different layers of security measures to prevent the breach of privacy and unintended disclosures. For example, the server may set an access code that must be submitted with a request, wherein the identification of an account may only be performed if an access code is provided and if the access code is correct.

The first program and the second program may be any program and may be the same or different. For example, the first program or the second program may be but not limited to: an instant messaging (IM) application such as WeChat® and QQ®, a browser application such as QQ® browser, Safari®, and Internet Explorer®, a word processing application such as Word®, a reading application such as QQ Book® and Kindle®, or a media player application, such as QQPlayer®. The first account and the second account are registered accounts of the application programs, wherein the first account and the second account may be identified through identifiers.

As shown by step S102 of FIG. 1, the server may receive a content forwarding request from the second terminal through the second account. The content forwarding request may be a request to the server for forwarding captured contents that are included in the content forwarding request. The captured contents may include contents such as texts, drawings, audio and video that are copied or duplicated by the second terminal through the second program. The captured contents may be temporarily or permanently stored in cache or other kinds of memory associated with second terminal. In addition to the captured contents, the content forwarding request may include a number of other informational items that may provide additional guidance and security to the server, the first terminal and the second terminal. For example, the content forwarding request may include a command that instructs the server to conduct certain operation, e.g. forwarding the captured contents, an identifier for the second account, and further instructions regarding how the captured contents may be processed.

In practice, the second program may provide a choice to the use to send the content forwarding request. For example, the menu of the second program may have a choice "copying to another device," or more specifically "copy to first terminal." By highlighting the captured contents and choosing the As shown in step S103 of FIG. 1, the server may provide services in response to the content forwarding request. In addition, such service may be provided based on the mapping relationship that has been established between the first account and the second account. For example, the server may send a message to the first terminal, wherein the message includes the captured contents so that the captured contents may be displayed, processed, and/or transmitted by the first terminal.

Figure 2:
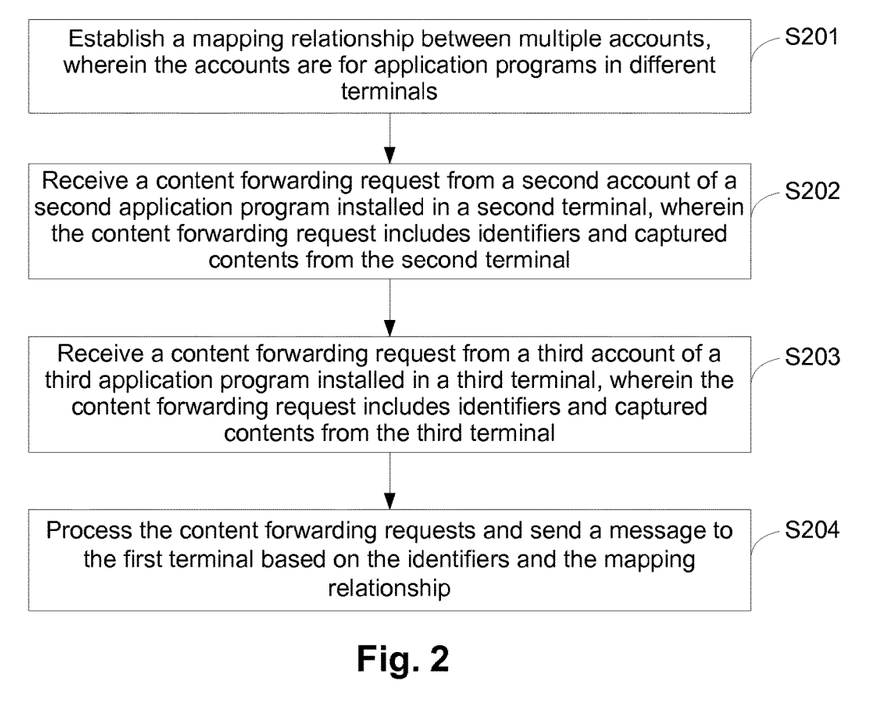
FIG. 2 is a flowchart illustrative of an information processing method related to multiple terminals in accordance with some embodiments of the present application.

FIG. 2 is a flowchart illustrative of an information processing method related to multiple terminals in accordance with some embodiments of the present application.

Figure 3:
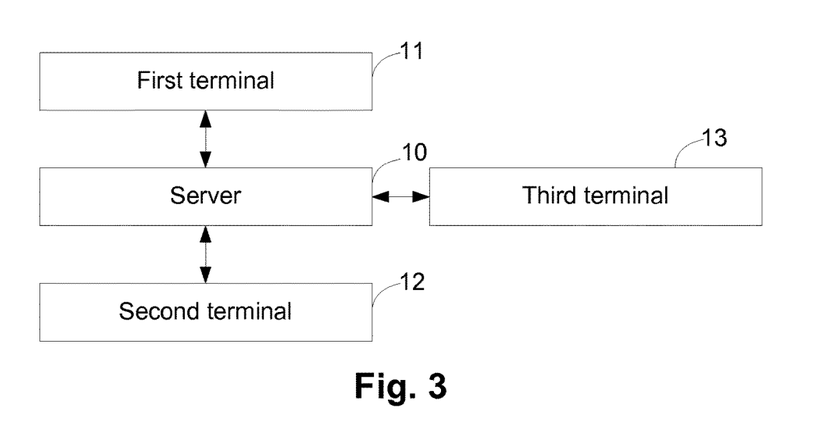
FIG. 3 is a block diagram illustrative of the interactions between the server and multiple terminals.

FIG. 3 is a block diagram illustrative of the interactions between the server and multiple terminals.

As indicated by step S201 of FIG. 2 and referring to FIG. 3, the server 10 may establish a mapping relationship between multiple accounts, wherein the accounts are for different application programs in different terminals. As indicated above, the application programs may be the same or different. In some embodiments, the application programs are different and more than two terminals, e.g. a first terminal 11, a second terminal 12, and a third terminal 13, are connected to the server 10. Based on the present application, the server 10 may synchronize captured contents, e.g. duplicated contents, from the different terminals through the accounts of different applications so that the contents may be presented and transferred more efficiently.

As indicated by step S202 of FIG. 2 and referring to FIG. 3, the server 10 may receive a content forwarding request from a second account of a second application installed in a second terminal 12, wherein the content forwarding request includes identifiers and captured contents from the second terminal 12. In addition, according to step S203, the server 10 may receive a content forwarding request from a third account of a third application program installed in a third terminal 13, wherein the content forwarding request includes identifiers and captured contents from the third terminal 13. In some embodiments, the captured contents are duplicated contents extracted by the second terminal 12 and/or the third terminal 13.

As indicated by step S204 of FIG. 2, in response to the content forwarding requests, the server 10 may process the content forwarding requests and send a message to the first terminal 11 based on the identifiers and the mapping relationship. The server 10 may process the content forwarding requests, as well as the captured contents in the content forwarding requests, based on predefined protocols. For example, the server 10 may eliminate one set of captured contents, e.g. the set that was captured the earliest, or latest, and only transfer the remaining captured contents. In some embodiments, the server 10 may combine all the captured contents, e.g. by listing all the contents in chronicle order, or by mixing the contents. In some embodiments, the server 10 may process the captured contents by extracting the URL connections to the contents and transferring only the URL to the first terminal 11. The message to the first terminal 11 may contain the processed captured contents and other informational items, such as the identifiers of the terminal sending out the captured contents, security warnings, and/or further commands to the first terminal as to how the captured contents should be further processed.

It should be noted that a same account may be associated with a program that is installed in multiple terminals. For example, it is possible for a user (or multiple users) to use the same browser account in different terminals, such as a first phone, a second phone, and a tablet computer. The browser account may be used by multiple terminals to send content forwarding requests to the server, wherein the different content forwarding requests may be processed by the server based on a preset protocol. For example, in Table 1, the captured contents from the different terminals are listed.

TABLE 1

| Account sending the captured contents | Captured Contents |
|---|---|
| Browser Account | Content 1 |
| Browser Account | Content 2 |
| Browser Account | Content 3 |

Content 1, content 2, and content 3 may be packaged in one or more messages from the server and sent to a recipient terminal, wherein these captured contents may be displayed and/or used by a recipient account of recipient program. In some embodiments, the contents may be listed by a pasting option so that the user of the recipient account may select which of content 1, content 2, and content 3 may be used. In some embodiments, the contents are automatically displayed or entered in a predefined field, e.g. a search field or text editing field, in the recipient program, e.g. a browser application.

Figure 4:
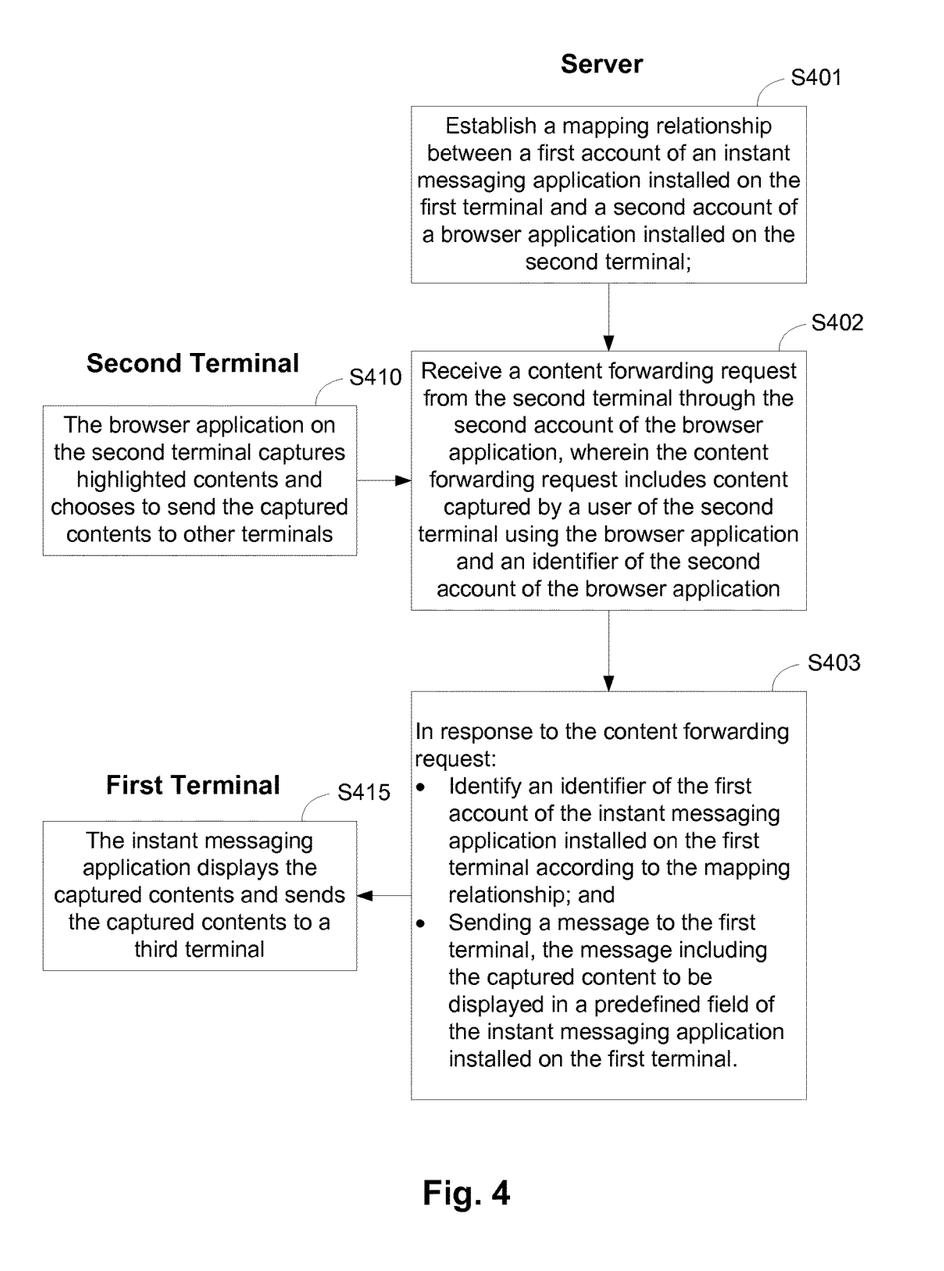
FIG. 4 is a flowchart illustrative of an information processing method in accordance with some embodiments of the present application.
Figure 5A:
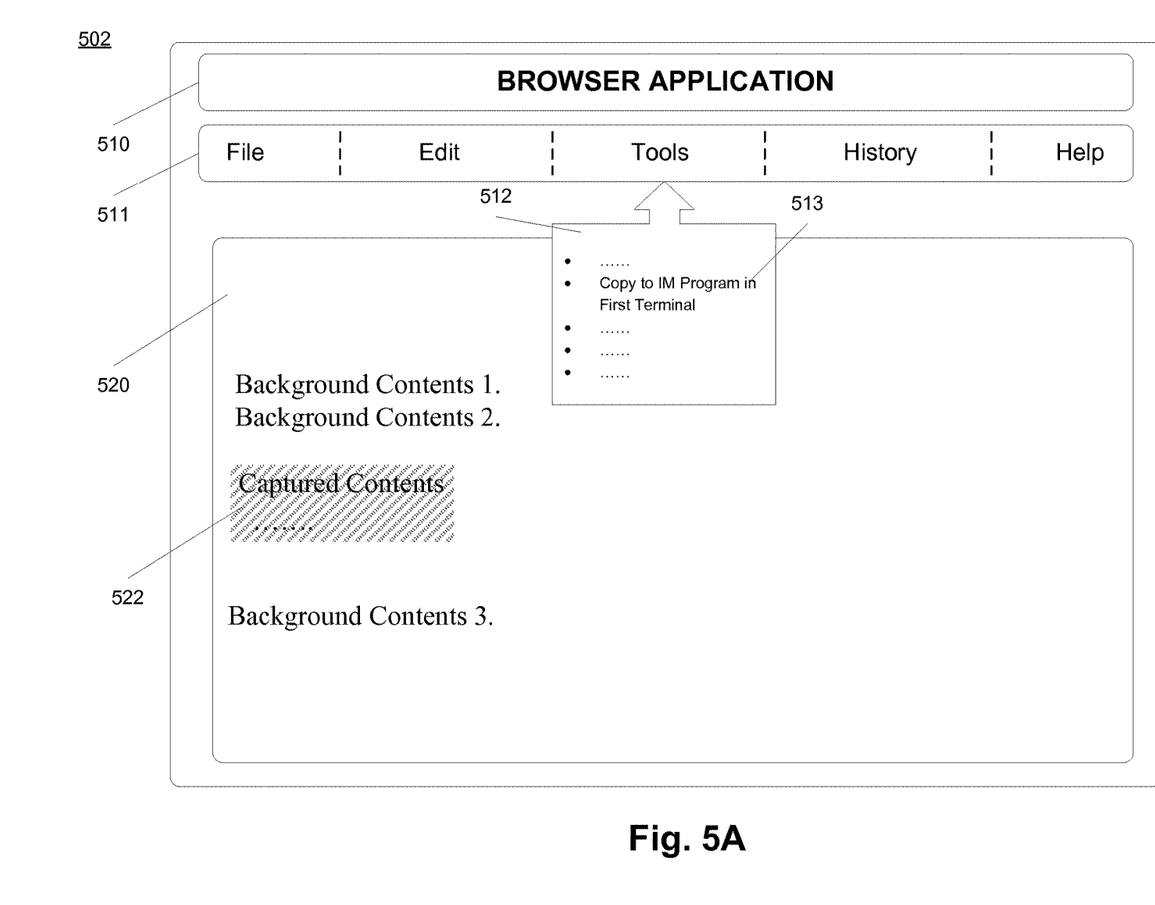
FIGS. 5A, 5B, and 5C are illustrative screenshots of application programs on different terminals in accordance with some embodiments of the present application.
Figure 5B:
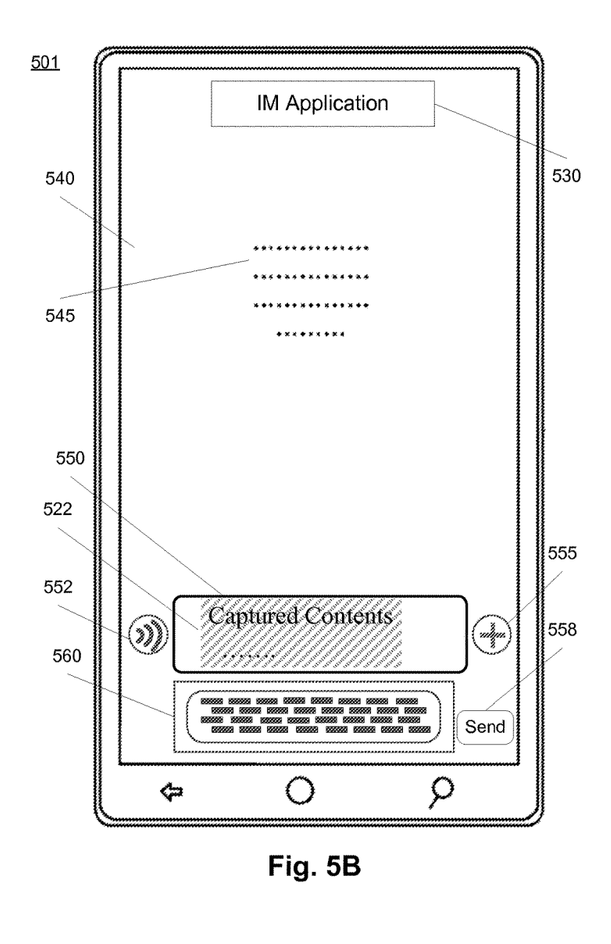
Figure 5C:
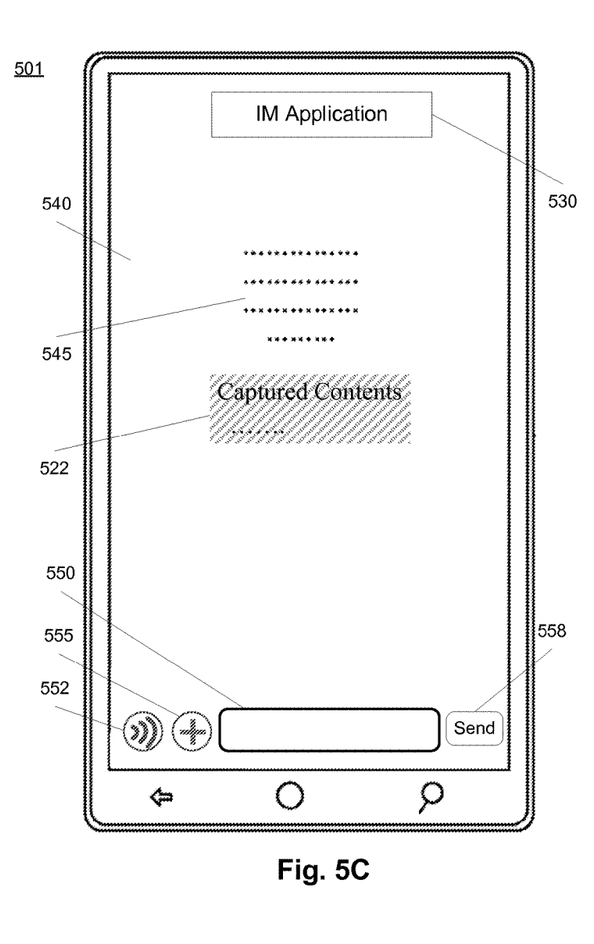

FIG. 4 is a flowchart illustrative of an information processing method in accordance with some embodiments of the present application. FIGS. 5A, 5B, and 5C are illustrative screenshots of application programs on different terminals in accordance with some embodiments of the present application.

As shown by step S401 of FIG. 4, the server may establish a mapping relationship between a first account of an instant messaging application installed on the first terminal and a second account of a browser application installed on the second terminal.

Step S410 of FIG. 4 shows that the browser application on the second terminal may capture highlighted contents and choose to send the captured contents to other terminals. In some embodiments, the captured contents may be first sent to the server as a part of a content forwarding request.

FIG. 5A shows an illustrative screenshot of a browser application before the content forwarding request is sent to the server. Shown in FIG. 5A is a second terminal 502, e.g. a desktop or laptop computer, and a browser interface having a title area 510, a menu 511, and a main display area 520. The title area 510 may be used to display the name of the application or the summary of the contents in the main display area 520. The menu 511 includes a number of menu items, which may be extended to sub-menus such as sub-menu 512. Shown in the main display area 520 are background contents and the captured contents 522, which are highlighted.

The sub-menu 512 includes a choice 513 of "Copy to IM program in First Terminal . . . " By selecting the choice 513, the second terminal 502 may initiate a process which captures, e.g. duplicates, the captured contents 522, generates a content forwarding request containing the captured contents 522, and sends the content forwarding request to the server so that the server may forward the captured contents to the first terminal. The sub-menu 512 serves as an example as to how the synchronization of captured contents may be triggered and/or confirmed. In some embodiments, the process of capturing contents, generating request, and sending request may be initiated by selecting a menu item in a context menu, e.g. right-click menu. The specifics of choice 513 may vary as well. In some embodiments, the target program and/or the target terminal for the synchronization may not need to be identified. For example, the server may forward the captured contents to all the terminals that have application programs with accounts that have been mapped to the second account in the browser program in the second terminal.

As shown in step 402 of FIG. 4, the server may receive the content forwarding request from the second terminal through the second account of the browser application, wherein the content forwarding request includes content captured by a user of the second terminal using the browser application and an identifier of the second account of the browser application.

As shown in step 403 of FIG. 4, in response to the content forwarding request, the server may identify an identifier of the first account of the instant messaging application installed on the first terminal according to the mapping relationship. In addition, the server may send a message to the first terminal, the message including the captured content to be displayed in a predefined field of the instant messaging application installed on the first terminal.

As indicated by step S415 of FIG. 4, the first terminal may display the captured contents in the instant messaging application. In some embodiments, the first terminal may send the captured contents to a third terminal.

FIG. 5B shows an illustrative screenshot of an IM application in the first terminal after receiving the message from the server. Shown in FIG. 5B is a first terminal 501, e.g. a smart phone, and an IM program interface having a title area 530, a main display area 540, a text editing field 550, a virtual keyboard 560, an audio-input switch button 552, a variety-input switch button 555, and a send button 558. The title area 530 may be used to display the name of the application or the summary of the contents in the main display area 540. The virtual keyboard may be used to enter texts in the text editing field 550. The audio-input switch button 552 may be used to switch to a format allowing audio input. The variety-input switch button 555 may be used to switch to a predefined field allowing inputting pictures, clip arts, stickers, or other formats. Shown in the main display area 540, which is a read-only field, are historic contents 545 that have been entered by the participants a communication session of the IM application. The text editing field 550 contains captured contents 522, which may be send to other terminals from the first terminal 501 by pressing the send button 558.

In some embodiments, after the server forwards the captured contents 522 from the second terminal 502 to the first terminal 501 via a message, the captured contents 522 may be stored in cache or other memory structures of the first terminal 501. When the first terminal 501 receives the message, the first terminal may extract the captured contents from the message and process the captured contents based on preset protocol or specific commands included in the message. In some embodiments, the user of the first terminal 501 may need to select "paste" or other menu items so that the captured contents 522 may be pasted into a predefined field, e.g. the text editing field 550. On the other hand, it may be automatically set that the captured contents are displayed in a predefined field such as the text editing field 550 shown in FIG. 5B.

FIG. 5C shows an alternative illustrative screenshot of an IM application after receiving the message from the server. Shown in FIG. 5C is a first terminal 501, e.g. a smart phone, and an IM program interface having a title area 530, a main display area 540, a text editing field 550, an audio-input switch button 552, a variety-input switch button 555, and a send button 558. Shown in the main display area 540, which is a read-only field, are historic contents 545 and the captured contents 522. The text editing field 550 is empty. In this embodiment, the captured contents 522 have been sent to the other participants in the communication session of the IM program. In some embodiments, FIG. 5C illustrates the display of the first terminal 501 after the sent button 558 has been selected in FIG. 5B—the captured contents 522 is first displayed in the text editing field 550 before being sent to the other terminals and shown in the main display area 540. Alternatively, FIG. 5C illustrates the result of an automatic transmission—the captured contents 522 is directly sent out by the first terminal 501 to the other terminals and shown in the display area 540 without additional operation by the user.

FIGS. 4 and 5A-C illustrate embodiments of the current method that may be useful and convenient to the users. In some embodiments, the first account for the IM program and the second account for the browser program belong to the same user, who may want to utilize a device with a larger screen to do content searches and viewing; the same user may also want to communicate with other participants of the IM program using a mobile device, such as a smart phone. With the current method, the user may capture contents in the second terminal, which may automatically send the captured contents to the first terminal, so that the first terminal may display the captured contents in a predefined field. The predefined field may be a text editing field, allowing the captured contents to be further processed and sent to a recipient terminal. In some embodiments, the predefined field may be a read-only filed, wherein the captured contents are displayed before or after being sent to the recipient terminals. The methods herein described eliminate the steps of manually transferring contents, e.g. sending emails between the terminals, or the inconvenience of using a small screen device to search and view contents.

Figure 6:
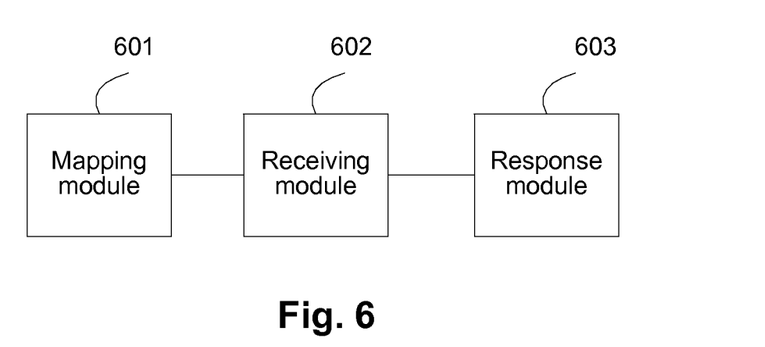
FIG. 6 is a schematic structural diagram of a server having multiple modules in accordance with some embodiments of the present application.
Figure 7:
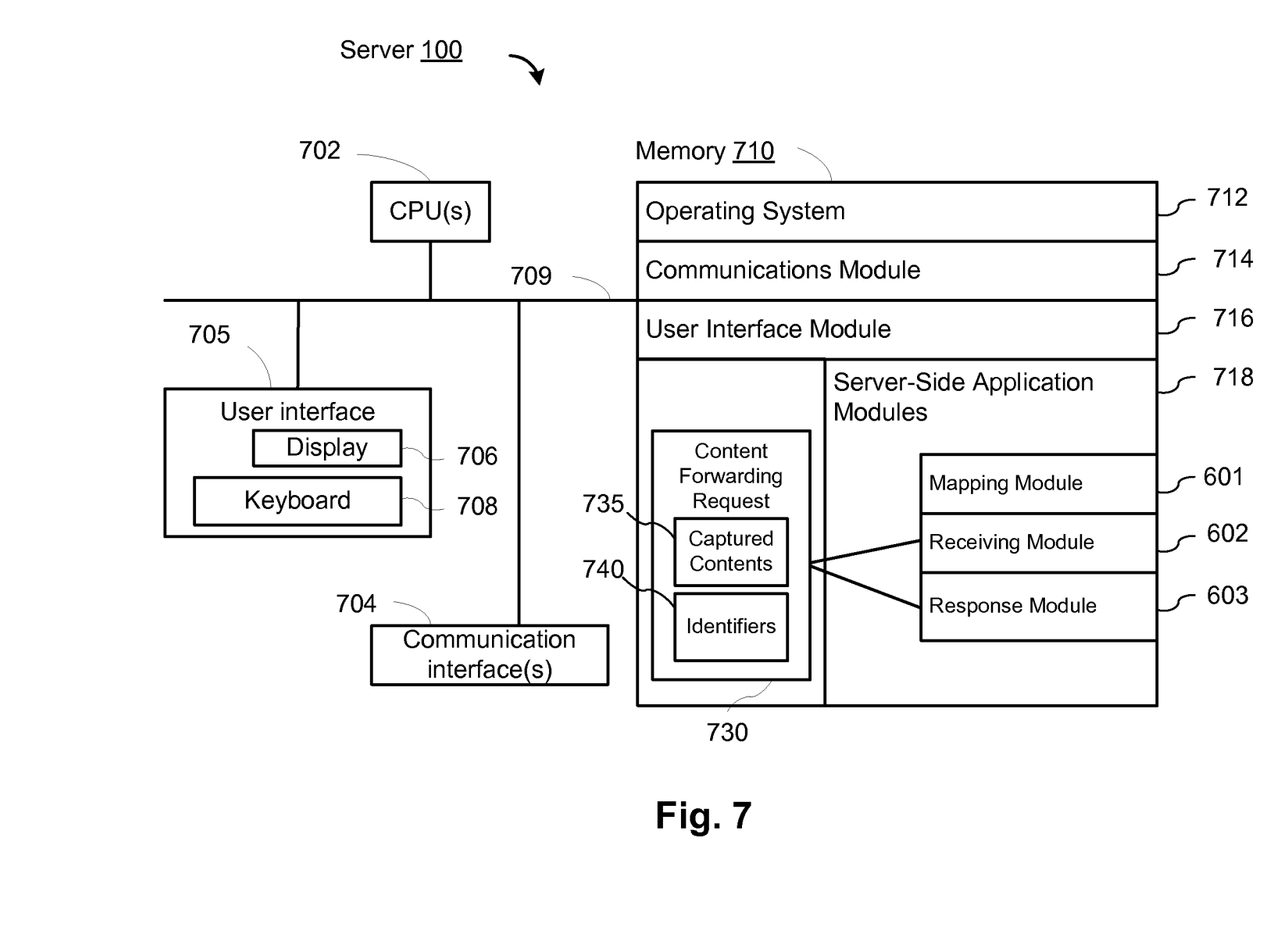
FIG. 7 is a block diagram of a server in accordance with some embodiments of the present application.

FIGS. 6 and 7 illustrate the computer system that may be used to perform the methods described in FIGS. 1, 2 and 4. To avoid redundancy, not all the details and variations described for the method are herein included for the computer system. Such details and variations should be considered included for the description of the devices as long as they are not in direct contradiction to the specific description provided for the methods.

FIG. 6 is a schematic structural diagram of a server having multiple modules in accordance with some embodiments of the present application.

The server may comprise one or more processors, memory, and one or more program modules stored in the memory and configured for execution by the one or more processors, the one or more program modules including: a mapping module 601 configured to establish a mapping relationship between a first account of an instant messaging application installed on the first terminal and a second account of a browser application installed on the second terminal; a receiving module 602 configured to receive a content forwarding request from the second terminal through the second account of the browser application, wherein the content forwarding request includes content captured by a user of the second terminal using the browser application and an identifier of the second account of the browser application; and a response module 603 configured to: in response to the content forwarding request, identify an identifier of the first account of the instant messaging application installed on the first terminal according to the mapping relationship; and send a message to the first terminal, the message including the captured content to be displayed in a predefined field of the instant messaging application installed on the first terminal.

In some embodiments, the second terminal is a desktop or laptop computer and the first terminal is a mobile device and the first account and the second account belong to a same user. In some embodiments, the predefined field is a text editing field or a read-only field. The captured content may be sent by the first terminal to a recipient terminal. In some embodiments, the mapping module is further configured to: map a third account with the first account and the second account; and the receiving module is further configured to receive a second content forwarding request through the third account; the response module is further configured to process the second content forwarding request; wherein the message further includes contents included in the second content forwarding request.

FIG. 7 is a block diagram of a computer system, e.g. a server, in accordance with some embodiments of the present application. The exemplary server 100 typically includes one or more processing units (CPU's) 702, one or more network or other communications interfaces 704, memory 710, and one or more communication buses 709 for interconnecting these components. The communication buses 709 may include circuitry (sometimes called a chipset) that interconnects and controls communications between system components. The server 100 may include a user interface 705, for instance, a display 706 and a keyboard 708. When the server 100 is a smart phone or tablet, the user interface 705 may include a touch screen, which is both a display and an input device. Memory 710 may include high speed random access memory and may also include non-volatile memory, such as one or more magnetic disk storage devices. Memory 710 may include mass storage that is remotely located from the CPU's 702. In some embodiments, memory 710 stores the following programs, modules and data structures, or a subset or superset thereof:

- an operating system 712 that includes procedures for handling various basic system services and for performing hardware dependent tasks;
- a network communication module 714 that is used for connecting the server 100 to the terminal or other computers via one or more communication networks (wired or wireless), such as the Internet, other wide area networks, local area networks, metropolitan area networks, and so on;
- a user interface module 716 configured to receive user inputs through the user interface 705;
- and a number of application modules 718 including the following:
- a mapping module 601 configured to establish a mapping relationship between a first account of an instant messaging application installed on the first terminal and a second account of a browser application installed on the second terminal;
- a receiving module 602 configured to receive a content forwarding request 730 from the second terminal through the second account of the browser application, wherein the content forwarding request 730 includes contents 735 captured by a user of the second terminal using the browser application and an identifier 740 of the second account of the browser application; and
- a response module 603 configured to: in response to the content forwarding request 730, identify an identifier of the first account of the instant messaging application installed on the first terminal according to the mapping relationship; and send a message to the first terminal, the message including the captured content 735 to be displayed in a predefined field of the instant messaging application installed on the first terminal.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for copying contents between a first terminal and a second terminal, the method comprising:
   at a server having one or more processors and memory storing programs executed by the one or more processors,
   establishing a mapping relationship between a first account of an instant messaging application installed on the first terminal and a second account of a browser application installed on the second terminal, wherein the first account at the first terminal is a participant in a communication session with one or more other accounts of the instant messaging application at one or more recipient terminals and the second account of the browser application does not participate in the communication session;
   receiving a content forwarding request from the second terminal through the second account of the browser application, wherein the content forwarding request includes content captured by a user of the second terminal using the browser application and an identifier of the second account of the browser application, and the content forwarding request is generated in response to the user selecting a content-sharing option in the browser application after capturing the content; and in response to the content forwarding request:
  identifying an identifier of the first account of the instant messaging application installed on the first terminal according to the mapping relationship; and
  sending a message to the first terminal and the one or more recipient terminals participating in the communication session, the message including the captured content, wherein the first terminal is configured to extract the captured content from the message and display the captured content in a predefined field of the communication session in the instant messaging application installed on the first terminal.

2. The method of claim 1, wherein:
the second terminal is a desktop or laptop computer and the first terminal is a mobile device.

3. The method of claim 1, wherein:
the predefined field is a text editing field.

4. The method of claim 3, wherein:
the captured content is sent to the one or more recipient terminals in response to a user input at the first terminal.

5. The method of claim 1, wherein:
the predefined field is a read-only field, wherein the captured content has been sent to the one or more recipient terminals.

6. The method of claim 1, wherein:
the first account and the second account belong to a same user.

7. The method of claim 1, further comprising:
mapping a third account with the first account and the second account.

8. The method of claim 7, further comprising:
receiving a second content forwarding request through the third account; and
processing the second content forwarding request; wherein
  the message further includes contents included in the second content forwarding request.

9. A server comprising:
one or more processors;
memory; and
one or more programs modules stored in the memory and configured for execution by the one or more processors, the one or more program modules including:
  a mapping module configured to establish a mapping relationship between a first account of an instant messaging application installed on the first terminal and a second account of a browser application installed on the second terminal, wherein the first account at the first terminal is a participant in a communication session with one or more other accounts of the instant messaging application at one or more recipient terminals and the second account of the browser application does not participate in the communication session;
  a receiving module configured to receive a content forwarding request from the second terminal through the second account of the browser application, wherein the content forwarding request includes content captured by a user of the second terminal using the browser application and an identifier of the second account of the browser application, and the content forwarding request is generated in response to the user selecting a content-sharing option in the browser application after capturing the content; and
  a response module configured to:
    in response to the content forwarding request,
      identify an identifier of the first account of the instant messaging application installed on the first terminal according to the mapping relationship; and
    send a message to the first terminal and the one or more recipient terminals participating in the communication session, the message including the captured content, wherein the first terminal is configured to extract the captured content from the message and display the captured content in a predefined field of the communication session in the instant messaging application installed on the first terminal.

10. The server of claim 9, wherein:
the second terminal is a desktop or laptop computer and the first terminal is a mobile device.

11. The server of claim 9, wherein:
the predefined field is a text editing field.

12. The server of claim 11, wherein:
the captured content is sent to the one or more recipient terminals in response to a user input at the first terminal.

13. The server of claim 9, wherein:
the predefined field is a read-only field, wherein the captured content has been sent to the one or more recipient terminals.

14. The server of claim 9, wherein:
the first account and the second account belong to a same user.

15. The server of claim 9, wherein the mapping module is further configured to:
map a third account with the first account and the second account.

16. The server of claim 15, wherein:
the receiving module is further configured to receive a second content forwarding request through the third account;
the response module is further configured to process the second content forwarding request; and
the message further includes contents included in the second content forwarding request.

17. A non-transitory computer readable storage medium having stored therein one or more instructions, which, when executed by a server, cause the server to:
establish a mapping relationship between a first account of an instant messaging application installed on the first terminal and a second account of a browser application installed on the second terminal, wherein the first account at the first terminal is a participant in a communication session with one or more other accounts of the instant messaging application at one or more recipient terminals and the second account of the browser application does not participate in the communication session;
receive a content forwarding request from the second terminal through the second account of the browser application, wherein the content forwarding request includes content captured by a user of the second terminal using the browser application and an identifier of the second account of the browser application, and the content forwarding request is generated in response to the user selecting a content-sharing option in the browser application after capturing the content; and
in response to the content forwarding request:
  identify an identifier of the first account of the instant messaging application installed on the first terminal according to the mapping relationship; and send a message to the first terminal and the one or more recipient terminals participating in the communication session, the message including the captured content, wherein the first terminal is configured to extract the captured content from the message and display the captured content in a predefined field of the communication session in the instant messaging application installed on the first terminal.

18. The non-transitory computer readable storage medium of claim 17, wherein:
the second terminal is a desktop or laptop computer and the first terminal is a mobile device.

19. The non-transitory computer readable storage medium of claim 17, wherein:
the predefined field is a text editing field.

20. The non-transitory computer readable storage medium of claim 17, wherein:
the predefined field is a read-only field, wherein the captured content has been sent to the one or more recipient terminals.

* * * * *